United States Patent [19]
Alden et al.

[11] Patent Number: 5,141,178
[45] Date of Patent: Aug. 25, 1992

[54] AERIAL REFUELING SYSTEM

[75] Inventors: Ralph E. Alden, Torrance; Guy G. Vennero, Ventura, both of Calif.

[73] Assignee: Whittaker Controls, Inc., Los Angeles, Calif.

[21] Appl. No.: 157,923

[22] Filed: Feb. 19, 1988

[51] Int. Cl.⁵ .............................. B64D 39/02
[52] U.S. Cl. .................. 244/135 A; 242/158.2
[58] Field of Search ......... 244/135 A; 242/86, 158 R, 242/158.2; 137/355.2

[56] References Cited

U.S. PATENT DOCUMENTS

| | | | |
|---|---|---|---|
| 2.598.306 | 5/1952 | Rostine | 242/86 |
| 2.760.777 | 8/1956 | Cotton | 244/135 A |
| 2.926.867 | 3/1960 | Nardone | 242/158 R |
| 2.973.171 | 2/1961 | Ward et al. | 244/135 A |
| 3.202.372 | 8/1965 | Meline et al. | 242/158.2 |
| 3.226.090 | 12/1965 | Sauerbrey | 242/158.2 |
| 3.272.453 | 9/1966 | Hallock | 242/158.2 |
| 3.674.049 | 7/1972 | Macgregor | 244/135 A |
| 4.534.384 | 8/1985 | Graham et al. | 244/135 A |

Primary Examiner—Sherman D. Basinger
Assistant Examiner—Thomas J. Brahan
Attorney, Agent, or Firm—Spensley Horn Jubas & Lubitz

[57] ABSTRACT

An aerial refueling system includes a reel mounted for rotation about a central axis for winding and unwinding a hose. A sheave is provided to receive the hose as it leaves the reel and to change the direction of the hose so that it trails axially of the reel. The sheave is mounted on a non-rotating carriage which is supported by the reel and moves axially along the reel as the reel rotates.

13 Claims, 5 Drawing Sheets

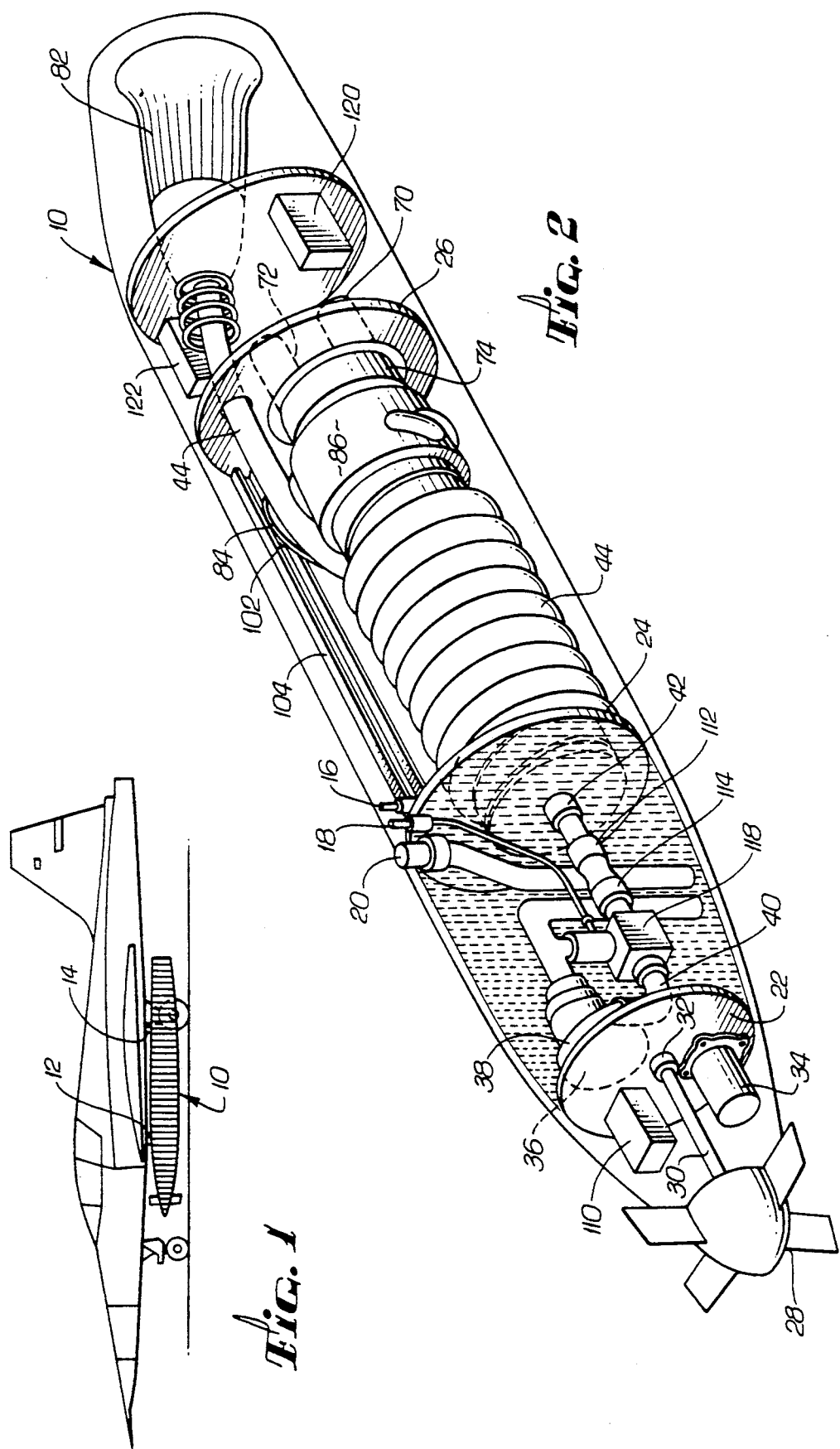

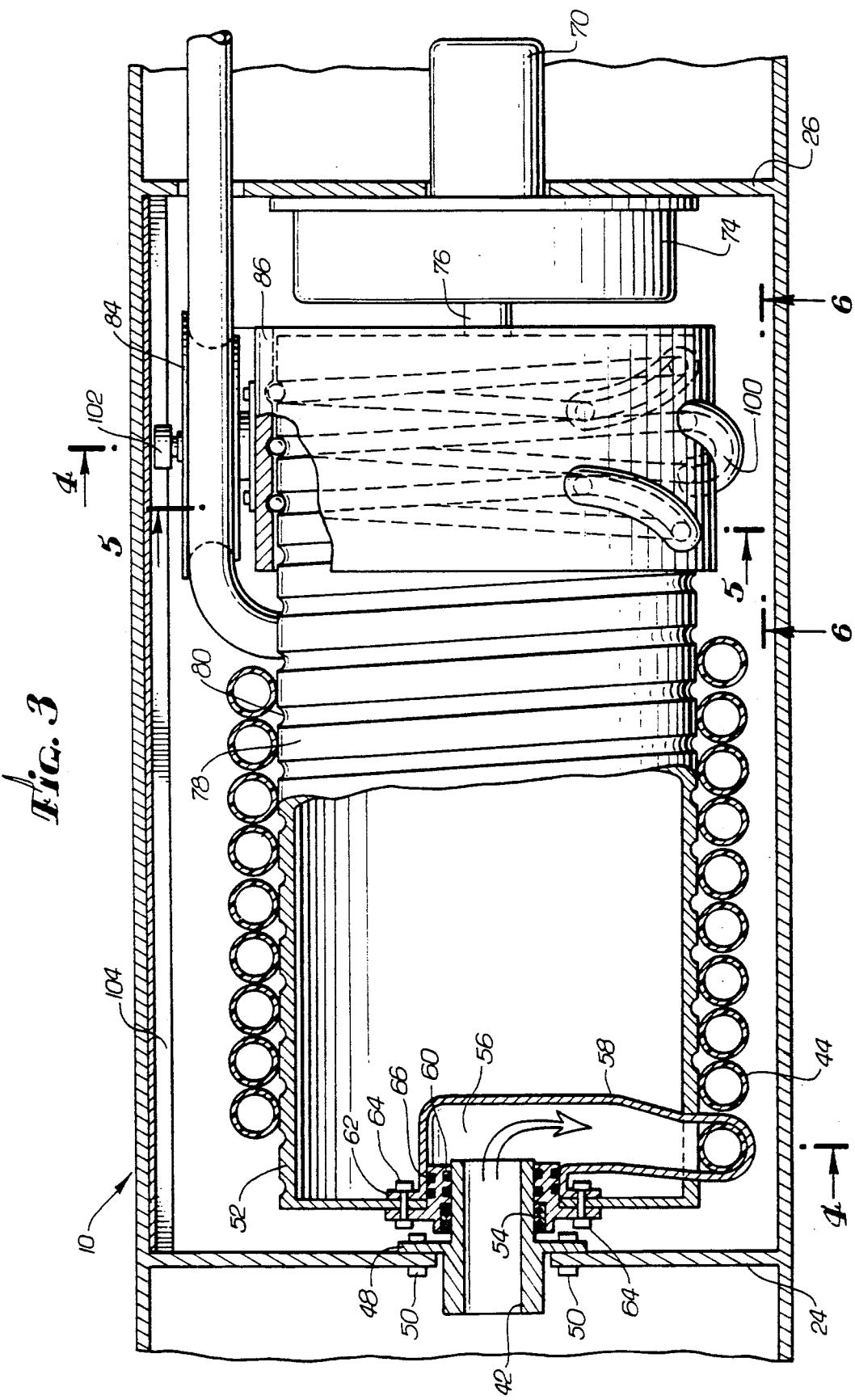

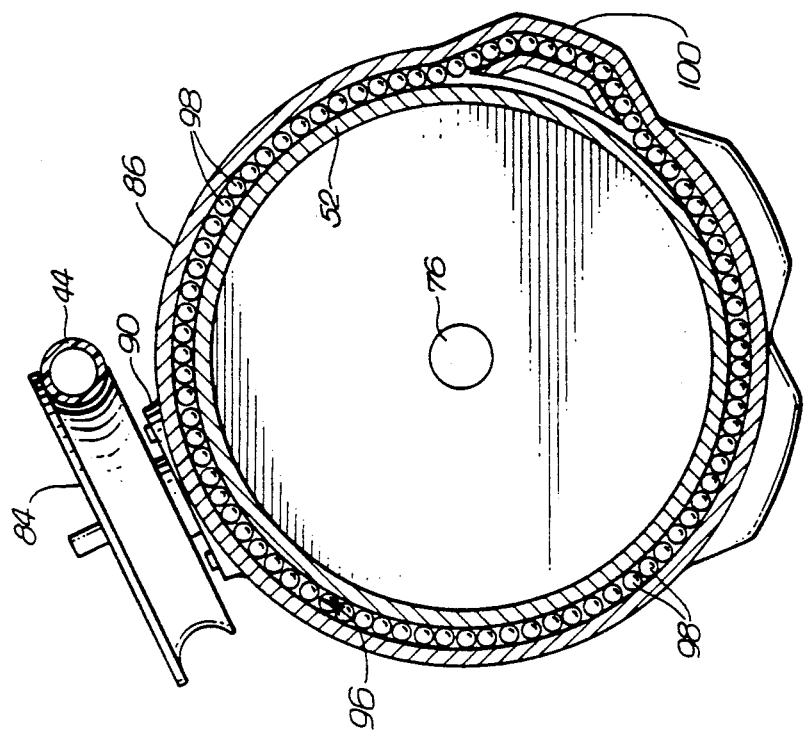
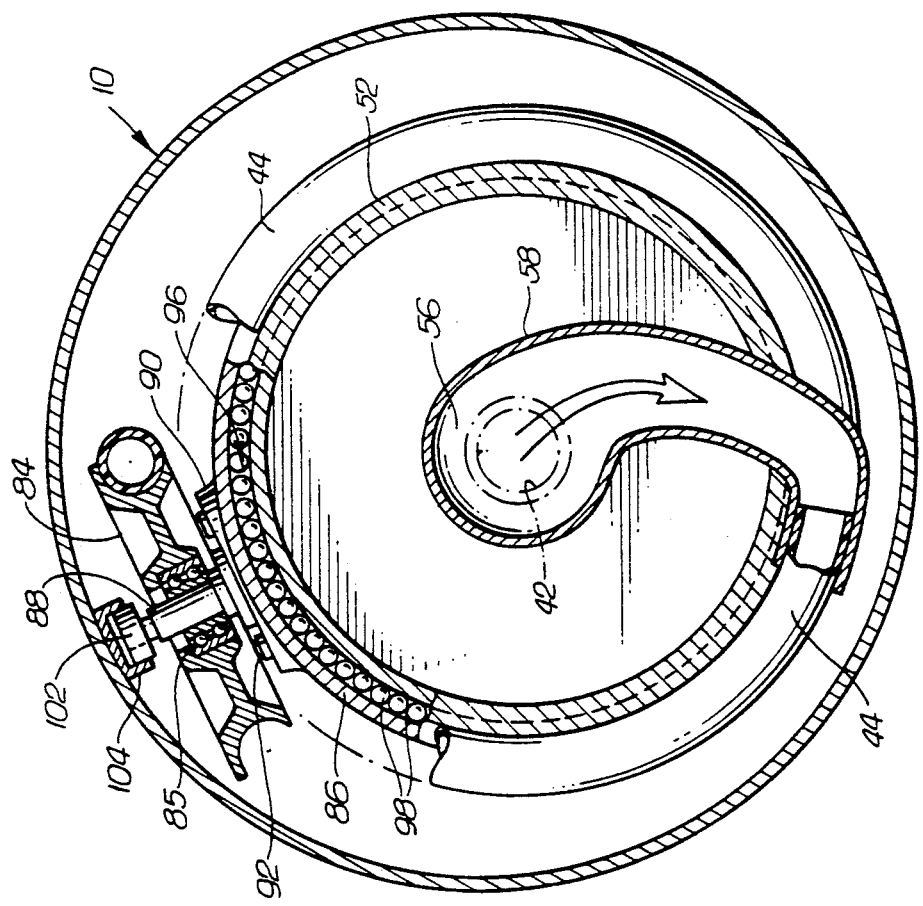

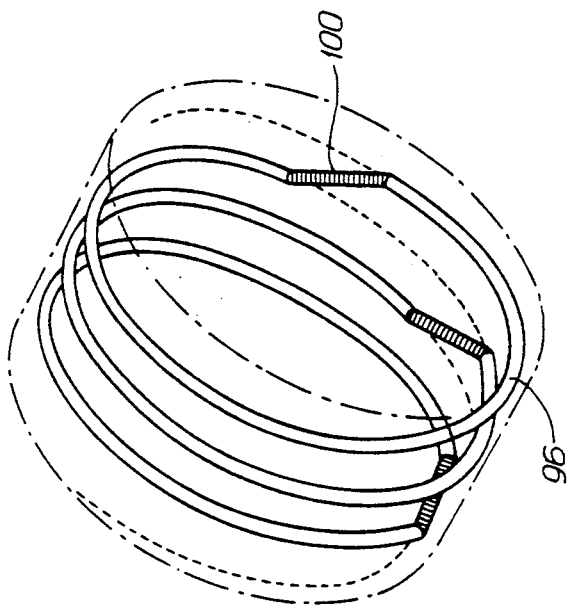
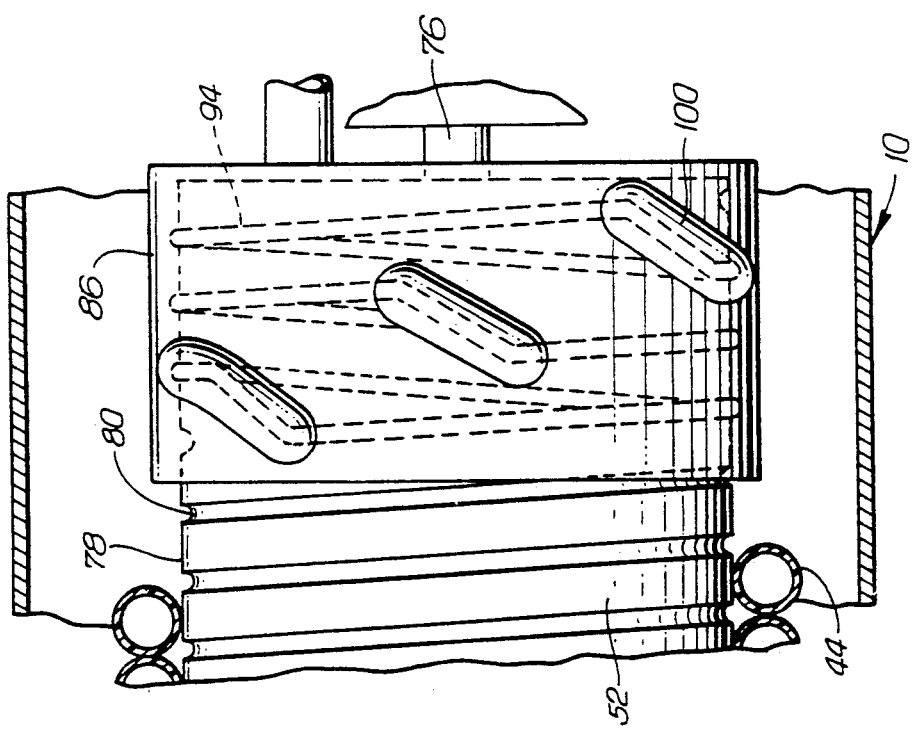

AERIAL REFUELING SYSTEM

BACKGROUND OF THE INVENTION

1. Field of the Invention

This invention relates to aerial refueling systems, and more particularly to aerial refueling systems which use a reel assembly to trail a hose through which fuel is transferred from a carrier aircraft to a receiver aircraft.

2. Description of Related Art

Aerial refueling dramatically increases the flight time and range of an aircraft. Refueling in flight saves time by eliminating the time consuming landing and take-off associated with refueling on the ground. It also saves fuel because an aircraft's fuel consumption is substantially higher while climbing than while cruising. As a result, an aircraft which is refueled in flight requires less time and less fuel to fly the same distance as an aircraft which is refueled on the ground. Additionally, an aircraft which is refueled in flight is not dependent on ground based facilities and can fly extended missions over areas where such facilities are unavailable.

Although conventional aerial refueling systems can be mounted directly within a carrier aircraft, they are most commonly contained within pods which are externally attached to the carrier aircraft. This eliminates the need for special tanker aircraft because any aircraft to which the refueling pod is attached can serve as a carrier aircraft. The pods may be of the "wet" variety, meaning that fuel is contained within the pod, or of the "dry" variety which requires an external fuel supply.

In conventional aerial refueling systems, refueling is accomplished by trailing a fuel supply hose from the carrier aircraft. The trailing end of the supply hose is provided with a pressure sensitive coupling drogue which is compatible with a connector on the receiving aircraft. The two aircraft are coupled by maneuvering them so that the drogue and the connector engage each other, fuel is then transferred from the carrier aircraft through the hose to the receiver aircraft. When the fuel transfer is complete, the planes are uncoupled and the hose is retracted. Several prior art refueling systems use reel assemblies to facilitate trailing and retracting the hose. In these systems, the hose is wrapped around the circumference of a drum shaped reel. The hose is trailed by rotating the reel such that the hose unwinds. The hose is retracted by reversing the direction of rotation and rewinding the hose.

One particular type of conventional refueling system uses a reel which rotates around an axis transverse to the direction of the trailing hose. However, in order to accommodate a hose which is long enough to allow the aircraft to maintain a safe distance during the refueling operation, the reel must be relatively long and the hose must be wrapped around the reel in multiple layers. As a result, the transversely mounted reel will only fit within a pod that has cross-sectional area which is too large to be carried by many tactical aircraft. Additionally, wrapping the hose in multiple layers tends to crush the lower layers resulting in damage to the hose. Because this damage occurs in the lower layers it is difficult to detect by visual inspection and may not be discovered until the pod is in operation. If this occurs, the fuel transfer operation may fail with the result that the mission must be aborted, possibly leaving the receiver aircraft without enough fuel to land safely.

Other refueling systems incorporate a hose reel which is mounted for rotation about an axis which is generally parallel to the trailing hose. This allows the use of a longer reel which can accommodate the necessary length of hose in a single layer. However, an axial reel requires a feeding device to change the direction of the hose from transverse of the drum for wrapping to axial of the drum for trailing. Previously, this has been accomplished by a carriage and sheave assembly. Conventionally, these assemblies usually require a number of support beams and guide rails to support the carriage and sheave in the proper position. The support beams and guide rails are mounted within the pod alongside the reel. As a result, the cross-section of this type of pod is still too large to be used with many types of aircraft.

Presently available refueling systems generally rely on hydraulic systems to supply power for rotating the reel. These systems are inherently bulky, heavy and require substantial maintenance. Additionally, it is very difficult to check the operational status of such systems prior to conducting a refueling operation.

SUMMARY OF THE INVENTION

An object of the present invention is to provide an improved aerial refueling system with a compact hose reel configuration that will fit into a pod of relatively small cross-sectional area so as to permit its use on smaller aircraft.

A further object of the invention is to provide an improved aerial refueling system with relatively few moving parts that is simple in structure and easy to manufacture.

A further object of the invention is to provide an improved aerial refueling system with a reel mechanism which protects the hose from being crushed or subject to undue wear and chafing and allows for visual inspection of the hose.

A further object of the invention is to provide an improved aerial refueling system that is dependable, reliable, easy to maintain and capable of being tested to determine its operational status without being activated.

A further object of the invention is to provide an improved aerial refueling system that is self-controlled and monitored so as to maintain a relatively constant hose tension and effectuate the desired fuel transfer with minimal pilot input.

In accordance with these and other objects, a preferred embodiment of the present invention comprises a hose having an inlet end and an outlet end. The inlet end of the hose is attached to the outer surface of a cylindrical reel. The reel is provided with a rotating mechanism for wrapping or unwrapping the hose around the outer surface thereof. The reel supports a non-rotating carriage which encircles the circumference of the reel and moves axially along the reel as the reel rotates. Attached to the carriage is a sheave which has an outer surface for receiving the hose and changing the direction of the hose from transverse of the reel for wrapping and unwrapping to axial of the reel for trailing and rewinding.

Although the hose reel system can be mounted directly in an aircraft, it is particularly well suited for use in a refueling pod. Because the reel supports the carriage and provides the motive force for its axial movement, there is no need for externally mounted support beams or threaded rods. This results in a smaller cross-section than that of presently available systems.

Other objects and aspects of the invention will become apparent to those skilled in the art from the detailed description of the invention which is presented by way of example and not as a limitation of the present invention.

BRIEF DESCRIPTION OF THE DRAWINGS

FIG. 1 is a side exterior view of an aerial refueling system in accordance with a preferred embodiment of the present invention, shown attached to a carrier aircraft.

FIG. 2 is an interior perspective view of the system of FIG. 1.

FIG. 3 is a partial sectional view of the system of FIG. 2.

FIG. 4 is a cross-sectional view of the system of FIG. 3 taken along line 4—4.

FIG. 5 is a cross-sectional view of the system of FIG. 3 taken along line 5—5.

FIG. 6 is a partial sectional view of the system of FIG. 3 taken along line 6—6.

FIG. 7 is a schematic diagram of the channels formed between the hose reel and carriage of the system of FIG. 3.

DETAILED DESCRIPTION OF THE DRAWINGS

Figure 9:
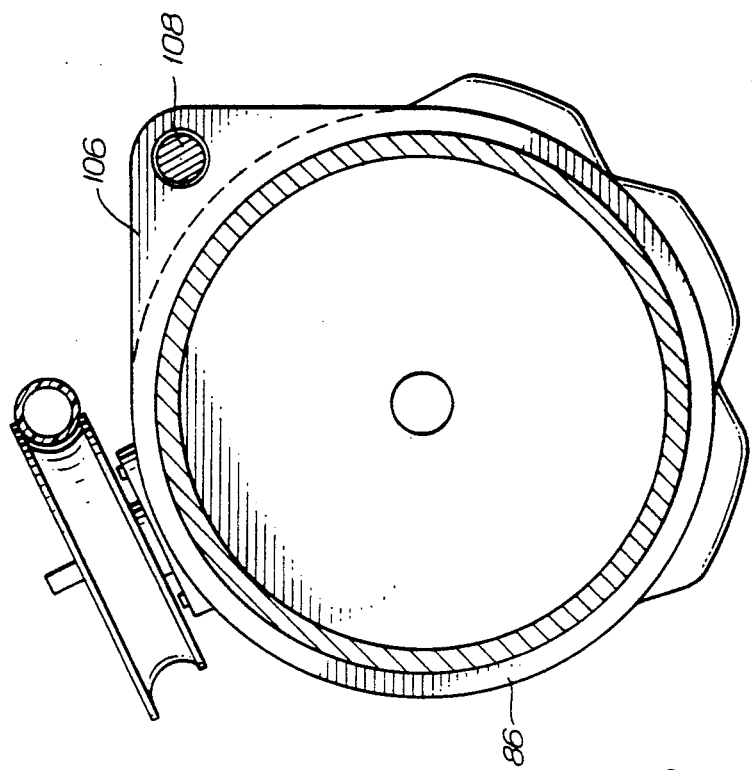
FIG. 9 is a cross-sectional view of the system of FIG. 8 taken along line 9—9.

An aerial refueling pod in accordance with a preferred embodiment of the present invention is indicated generally at 10. The exterior of the pod 10 is of a conventional aerodynamic design and is provided with attachment lugs 12 and 14 for attaching it to the carrier aircraft. Preferably, the attachment lugs 12 and 14 are of the type used to attach standard external fuel tanks or weapon systems to an aircraft. Consequently, the refueling pod 10 may be attached to a large number of aircraft which are adapted to receive the standard carrier lugs.

As shown in FIG. 2, the pod 10 also includes an electrical port 16, an air port 18, and a fuel port 20 through which appropriate interface connections to the carrier aircraft can be made. Preferably, these are also of standard types.

The pod 10 of the illustrated embodiment has a modular construction and is separated into various compartments by a forward bulkhead 22, a middle bulkhead 24 and an aft bulkhead 26. Each compartment is accessible through an access door (not shown) which extends substantially along the length of the pod and facilitates maintenance and repair of the components within the pod 10.

The forward end of the pod 10 is provided with a ram air turbine 28 which serves as a power supply for the pod 10. A turbine output shaft 30 is connected to a power take-off gear box 32 which is mounted within the forward bulkhead 22. The power take-off gear box 32 contains the appropriate gearing to drive an electric generator 34 which provides the electric power required by the pod 10 once it is activated. The power take-off gear box 32 is also connected through an electric clutch 36 to a fuel pump 38. The generator 34 and fuel pump 38 are also mounted on the forward bulkhead 22. In the illustrated "wet" pod, the space between forward bulkhead 22 and the middle bulkhead 24 stores fuel to be transferred. If desired, additional fuel can be stored externally of the pod. Externally stored fuel would enter the fuel storage area via the fuel port 20 prior to being transferred. In a "dry" pod (not shown), all of the fuel to be transferred is stored externally and is transferred through the fuel port 20 directly to the fuel pump.

In either embodiment, the fuel leaves the fuel pump 38 through an outlet line 40 which is connected to an input fuel fitting 42. As best seen in FIG. 3, the input fuel fitting 42 extends through the middle bulkhead 24 and communicates with the inlet end of the hose 44 via an input plenum 58. The input fuel fitting 42 is provided with a flange 48 which is securely bolted to the middle bulkhead 24 with a plurality of bolts 50 such that the input fuel fitting 42 provides a stable support for the front end of a cylindrical reel 52 which is rotatably mounted thereon. The reel 52 supports the hose 44 and is mounted on the input fuel fitting 42 with a double bearing 54 to ensure that it rotates freely. The inner race of the bearing is supported by the input fuel fitting 42 which extends a short distance beyond the front wall of the reel 52 into a chamber 56 formed by the input plenum 58. The input plenum 58 has a flange 62 which is flush against the inside of the front wall of the reel 52. The outer race of the double bearing 54 and the flange 62 of the input plenum 58 sandwich the end wall of the reel 52 and are secured by a plurality of bolts 64 extending through all three elements and squeezing them tightly together. Dual seals 60 are provided to prevent fuel from leaking from the chamber 56 or reaching the bearing 54. Likewise, a double seal 66 is used to prevent leakage from the plenum 58. The plenum 58 forms a chamber 56 surrounding the end of the input fuel fitting 42 and extending radially away from the input fuel fitting 42 to the outer surface of the reel 52 where the input end of the hose 44 is attached to it. Thus, a leak-free conduit is provided from the stationary input fuel fitting 42 to the hose 44 on the rotating drum 52.

The reel 52 extends from the middle bulkhead 24 to the aft bulkhead 26 with its axis of rotation generally parallel to the axis of the pod. The force to rotate the reel is provided by two electric motors 70 and 72 (best seen in FIG. 2), attached to a gear box 74 which is fixed to the aft bulkhead 26. The motors 70 and 72 should be of a type with a high output to weight ratio. Motors using rare earth magnets and inside out construction are particularly well suited for this application. The motors 70 and 72 are connected to a gear box 74 which is provided with the appropriate gearing to combine the motor speeds and produce a torque at the output shaft approximately equal to the input torque of each motor. This configuration results in improved reliability since should one motor fail, the remaining motor can still complete the refueling operation at half speed. The output shaft 76 from the gear box 74 engages the aft end of the reel 52 and provides a support therefor.

The details of construction are set forth herein for purposes of illustrating the invention only. Clearly the invention can be practiced in a variety of other embodiments.

The reel 52 of the illustrated embodiment has an outer surface 78 for receiving the hose 44. The outer surface 78 of the reel 52 includes a helical groove 80 having a semicircular or gothic cross-section. The pitch of the helical groove 80 is approximately equal to the outside diameter of the hose 44. Depending on its direction of rotation, the hose 44 either winds or unwinds around the outer surface 78 of the reel 52 as it rotates. The free end of the hose 44 has a coupling drogue 82 (shown in FIG. 2) for engaging with a connector (not shown) on the aircraft to be refueled. As the hose 44 is unwound from the reel 52, the drogue 82 trails behind the pod 10, allowing the refueling aircraft to couple with the drogue 82 and form a leak-free circuit through which fuel may be transferred.

In order to feed the hose 44 in the proper position on the reel 52 as it is being wound or unwound, a sheave 84 mounted on a movable carriage 86 is positioned adjacent the reel 52 in a plane generally tangent to the outer surface 78 at the point where the hose 44 leaves the reel 52. The sheave 84 is a pulley-like member with an outer surface which is recessed to receive the hose 44. The hose 44 is wound partially around the sheave 84 to change its direction from transverse of the reel 52 for winding and unwinding to axial of the reel 52 for trailing and rewinding. The sheave 84 positioned in this manner receives the hose 44 as it leaves the surface of the reel 52 and smoothly changes its direction for trailing and rewinding.

To reduce wear and friction on the hose 44 as it changes direction, the sheave 84 is mounted on bearings 85, seen best in FIG. 4, for free rotation about a central shaft 88. The shaft 88 is a cantilever member provided with a flange 90 on one end. It is securely attached to a carriage 86 by a plurality of rivets 92 extending through holes provided in the flange 90.

The carriage 86 of the illustrated embodiment is a collar shaped member which encircles the reel 52. In this manner, the carriage 86 and sheave 84 are supported by the reel 52, eliminating the need for extraneous support structures. The carriage 86 is sized such that the reel 52 is freely rotatable within it. As illustrated with dashed lines in FIG. 6, the inner surface of the carriage 86 is provided with a plurality of helical grooves 94. Each groove 94 has a semicircular or gothic cross-section of approximately the same dimension as the groove 80 on the outer surface 78 of the reel 52. Each groove 94 also has a pitch equal to the pitch of the groove 80 on the outer surface 78 of the reel 52. However, as shown in FIGS. 6 and 7, the grooves 94 on the carriage 86 are not a continuous helix, but are positioned such that if each groove 94 were extended a continuous helix would be formed. The carriage 86 is situated on the reel 52 such that the grooves on the carriage and the groove on the reel form distinct helical channels 96 as diagramed in FIG. 7, having a circular cross-section. As best illustrated in FIG. 5, a plurality of round balls 98 with a diameter equal to the diameter of the circular channel 96 are located in these channels. External conduits 100 on the carriage 86 having the same size circular diameter and filled with balls 98 connect the beginning of each channel 96 with the end of the same channel 96, thus forming a plurality of independent continuous circuits within which the balls 98 continuously recirculate. The very low friction of the rolling balls 98 allows the reel 52 to rotate freely within the non-rotating carriage 86 much like a ball-nut assembly.

When the reel 52 is rotated the rolling balls 98 interact with the groove 80 on the outer surface 78 of the reel 52 and the grooves 94 on the carriage 86 and impart axial motion to the carriage. The carriage 86 will move axially along the reel 52 the distance of one outside hose diameter per revolution. This causes the sheave 84 to place successive wraps of the hose 44 adjacent to the previous wrap, and wrap the hose 44 in a single layer around the outer surface 78 of the reel 52.

Referring again to FIG. 4, in order to resist any forces which might tend to rotate the carriage 86, the central shaft 88 extends past the sheave 84 and is provided with a freely rotatable bearing surface 102 at its distal end. A channel 104 is provided within the pod 10, extending axially along the reel 52. The channel 104 engages the bearing surface 102 and limits its motion to an axial direction along the reel 52.

Figure 8:
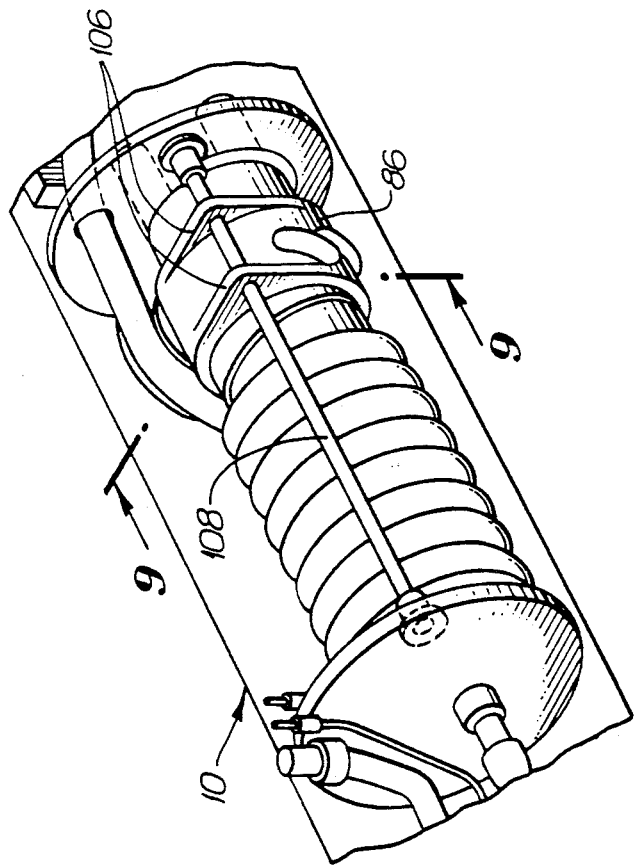
FIG. 8 is a partial perspective view of an aerial refueling system in accordance with another embodiment of the present invention.

In another embodiment, shown in FIGS. 8 and 9, rotation of the carriage 86 is prevented by extension elements 106 on the carriage. The extension elements are provided with holes through which a rod 108 extends, the rod 108 being mounted within the pod 10 and extending axially along the reel 52. Thus, the carriage 86 is prevented from rotating about the axis of the reel 52.

Because components of the present embodiment are electrical, the present aerial refueling system is particularly well suited for control by an electronic control module 110, shown in FIG. 2. The control module 110 receives dual input signals, from a pressure transducer 112, a fuel flow transducer 114, a position transducer within the gear box 74, and a hose tension sensor also within the gear box 74. The electronic control module 110 can be provided with a microcomputer and the appropriate peripheral circuitry to monitor the input and provide the appropriate control signals to the electric clutch 36, a shut-off by pass valve 118 and dual motor control electronics 120 and 122. Ideally, the sensors produce a dual redundant output signal so as to provide increased reliability. The control module 110 can also be provided with circuitry to perform a preflight diagnostic check on all of the critical electrical elements of the illustrated aerial refueling system.

This detailed description is set forth only for purposes of illustrating an example of the present invention and should not be considered to limit the scope thereof in any way. Clearly, numerous additions, substitutions and other modifications can be made to the invention without departing from the scope of the invention which is defined in the appended claims and equivalents thereof.

We claim:

1. A reel system for trailing a hose comprising:
   (a) a hose;
   (b) a reel mounted for rotation about a central axis, said reel having an outer surface for receiving the hose, said outer surface being provided with a helical groove;
   (c) feed means for selectively feeding the hose onto and away from the reel, said feed means comprising a sheave having a surface shaped to change the direction of the line from transverse of the reel for wrapping and unwrapping to axial of the reel for trailing and rewinding;
   (d) rotating means for rotating the reel; and
   (e) moving means carried by the outer surface of the reel and adapted to engage the helical groove, for moving the feed means axially along the reel to wrap the hose around the outer surface of the reel as it rotates, said moving means comprising a carriage having an aperture adapted to receive the reel and allow the reel to rotate therein, said sheave being mounted on said carriage.

2. The system of claim 1 wherein the moving means further comprises a plurality of rolling elements provided on the inner surface of the aperture in the carriage and engaging the helical groove on the outer surface of the reel.

3. The system of claim 2 wherein the moving means includes anti-rotation means for preventing the carriage from rotating about the axis of the reel.

4. An aerial refueling system comprising:
   (a) an elongated pod;
   (b) means for attaching the pod to an aircraft;
   (c) a hose;
   (d) a reel mounted within said pod for rotation about a central axis extending along the longitudinal direction of the pod, said reel having an outer surface for receiving the hose, said outer surface being provided with a helical groove;
   (e) a carriage supported by the reel, said carriage having an inner surface extending substantially around the circumference of the reel;
   (f) anti-rotation means to prevent the carriage from rotating around the axis of the reel.
   (g) sheave means carried by the carriage for guiding the hose onto the outer surface of the reel, said sheave means provided with a surface for receiving the hose, said surface changing the direction of the hose from transverse of the reel to axial of the reel;
   (h) rotating means for rotating the reel to wrap the hose around the outer surface of the reel; and
   (i) moving means interacting with the helical groove on the outer surface of the drum for moving the carriage and sheave axially along the drum.

5. The system of claim 4 wherein the moving means is located on the inner surface of the carriage.

6. The system of claim 4 wherein the inner surface of the carriage is provided with a helical groove corresponding to the groove on the outer surface of the reel, said reel groove registering with the carriage groove to define a channel, the moving means further comprising at least one circuit of rolling elements within said channel.

7. The system of claim r wherein the anti-rotation means comprises an element extending from the carriage and a guide means disposed from the drum extending axially along the drum, for engaging said element and limiting its motion to axial of the drum to thereby prevent the carriage from rotating.

8. The system of claim 4 wherein the sheave means comprises a pulley rotatably mounted on the carriage such that the plane of the pulley is substantially tangent to the outer surface of the drum.

9. An in-flight aircraft refueling system comprising:
   (a) an elongated pod;
   (b) means for attaching said pod to an aircraft;
   (c) a hose;
   (d) a reel mounted within the pod for rotation about an axis extending along the longitudinal direction of the pod, said reel being provided with an outer surface for receiving the hose, the outer surface of said reel being provided with a helical groove;
   (e) a carriage supported by the reel, said carriage being provided with an inner surface forming an aperture for receiving the reel, said inner surface having at least one helical groove corresponding with the helical groove on the outer surface of the reel;
   (f) an element extending from the carriage outwardly away from the reel;
   (g) a guide member mounted within the pod extending axially along the drum, said guide member engaging the element and limiting its motion to a direction along the reel;
   (h) a pulley rotatably mounted on the extension element, the outer surface of the pulley being positioned to receive the hose and change the direction of the hose from transverse of the reel to axial of the reel;
   (i) rotating means for rotating the reel to wrap the hose around the outer surface of the reel; and
   (j) at least one circuit of continuously recirculating rolling elements rolling in the channel formed by the corresponding helical grooves in the outer surface of the drum and the inner surface of the carriage, said rolling elements imparting longitudinal movement to the non-rotating carriage when the drum is rotated.

10. An aerial refueling system comprising:
    (a) an elongated refueling pod;
    (b) means for attaching the pod to an aircraft;
    (c) a turbine located at the leading end of the pod such that movement of the pod through air operates said turbine;
    (d) an electric generator connected to the output of said turbine;
    (e) a hose having an inlet end and an outlet end;
    (f) a reel mounted within said pod for rotation about an axis extending along the longitudinal direction of said pod, said reel being provided with an outer surface for receiving the hose, the inlet end of the hose being connected to said reel;
    (g) means for rotating the reel to wrap the hose around the outer surface of the reel, said rotating means comprising at least one electric motor, said motor receiving operating power from the generator;
    (h) means for feeding the hose of the reel for wrapping or unwrapping the hose around the outer surface of the reel according to the direction of rotation of the reel, said feed means comprising a sheave having a surface shaped to change the direction of the hose from transverse to the reel for wrapping and unwrapping to axial of the reel for trailing and rewinding; and
    (i) moving means carried by the outer surface of the reel, for moving the feed means axially along the reel to unwrap the hose from the outer surface of the reel as it rotates, said moving means comprising a carriage having an aperture adapted to receive the reel and allow the reel to rotate therein, said sheave being mounted on said carriage.

11. The system of claim 10 further comprising control means responsive to a single command for controlling the rotating means to trail the hose, maintain constant tension on the hose during the fuel transfer and retract the hose when the fuel transfer is complete, said control means further controlling the fuel pump and monitoring the rate and amount of fuel transferred.

12. The system of claim 11 wherein the control means comprises a microprocessor and receives power from the generator.

13. The system of claim 10 wherein the control means further comprises diagnostic system means for performing a preoperational status check of the electric elements of the refueling system.

* * * * *